United States Patent
Biglarbegian et al.

(10) Patent No.: US 12,250,019 B2
(45) Date of Patent: Mar. 11, 2025

(54) PHASED ARRAY SYSTEMS AND METHODS WITH PHASE SHIFTER

(71) Applicant: Apple Inc., Cupertino, CA (US)

(72) Inventors: Behzad Biglarbegian, San Jose, CA (US); Saikat Sarkar, Irvine, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/946,861

(22) Filed: Sep. 16, 2022

(65) Prior Publication Data
US 2023/0086630 A1 Mar. 23, 2023

Related U.S. Application Data

(63) Continuation of application No. 17/481,158, filed on Sep. 21, 2021.

(51) Int. Cl.
| | |
|---|---|
| *H04B 1/44* | (2006.01) |
| *H04B 1/00* | (2006.01) |
| *H04B 1/16* | (2006.01) |

(52) U.S. Cl.
CPC ............ *H04B 1/44* (2013.01); *H04B 1/0078* (2013.01); *H04B 1/1615* (2013.01)

(58) Field of Classification Search
CPC .......... H04B 1/44; H04B 1/006; H04B 1/005; H04B 1/401; H04B 1/0483; H04B 1/0078;
(Continued)

(56) References Cited

U.S. PATENT DOCUMENTS

| 4,635,062 A | 1/1987 | Bierig et al. |
| 10,476,157 B1 * | 11/2019 | Segoria .................. H03H 7/20 |

(Continued)

FOREIGN PATENT DOCUMENTS

| KR | 1020080108546 A | 12/2008 |
| WO | 2021134383 A1 | 8/2021 |

OTHER PUBLICATIONS

Byung-Wook Min et al.: "Single-Ended and Differential Ka-Band BiCMOS Phased Array Front Ends", IEEE Journal of Solid-State Circuits, vol. 43, No. 10, Oct. 1, 2008 (XP011235948); pp. 2239-2250.

(Continued)

*Primary Examiner* — Golam Sorowar
(74) *Attorney, Agent, or Firm* — FLETCHER YODER PC

(57) ABSTRACT

This disclosure provide various techniques for improving the quality of a signal. By integrating phase-shifting circuitry with a transmit/receive (T/R) switch, insertion loss may be reduced while decreasing space consumed on an integrated circuit or printed circuit board. In particular, embodiments disclosed herein include a transmitter and a receiver, each including one or more differential amplifiers coupled to a first inductor, and a switching network coupled to a second inductor and one or more phase-shifting circuitries. A differential interface of the differential amplifiers may enable integration of a stage of the phase shifter (e.g., a 180 degree stage) with the T/R switch, such that a single circuit may operate as the phase shifter and the T/R switch. This implementation may reduce the number of T/R switches and phase shifter stages in the phased array system, reducing the overall insertion loss experienced by the phased array system.

20 Claims, 15 Drawing Sheets

(58) Field of Classification Search
CPC .... H04B 1/0057; H04B 1/1615; H04B 1/406; H04B 1/0458; H04B 1/18; H04B 1/40; H04B 1/48; H04B 7/0404; H04B 1/0067; H04B 1/525; H04B 1/04; H04B 1/0475; H04B 1/3816; H04B 2001/0408; H04B 1/00; H04B 1/0071; H04B 1/28; H04B 7/0602; H04B 7/0817; H04W 52/0274; H04W 48/16; H04W 48/18; H04W 92/08; H04W 72/0453

See application file for complete search history.

(56) References Cited

U.S. PATENT DOCUMENTS

| | | |
|---|---|---|
| 10,992,334 B2 | 4/2021 | Ezz et al. |
| 2007/0218856 A1 | 9/2007 | Vilhonen |
| 2015/0207536 A1 | 7/2015 | Yehezkely et al. |
| 2017/0230028 A1 | 8/2017 | Gamal El Din et al. |
| 2020/0021024 A1* | 1/2020 | Park .................. H04B 1/0475 |
| 2020/0106472 A1 | 4/2020 | Emami-Neyestanak |
| 2020/0161761 A1 | 5/2020 | Domino |
| 2020/0403584 A1 | 12/2020 | Varonen et al. |
| 2022/0231391 A1* | 7/2022 | Wang .................. H03H 7/20 |

OTHER PUBLICATIONS

Extended European Search Report for European Patent Application No. 22189345.6 dated Feb. 13, 2023; 11 pgs.

Notice of Rejection for Korean Patent Application No. 10-2022-0108501 dated Jan. 16, 2024; 4 pgs.

* cited by examiner

PHASED ARRAY SYSTEMS AND METHODS WITH PHASE SHIFTER

CROSS-REFERENCE TO RELATED APPLICATION

This application is a continuation of U.S. patent application Ser. No. 17/481,158 entitled "PHASED ARRAY SYSTEMS AND METHODS WITH PHASE SHIFTER," filed on Sep. 21, 2021, which is hereby incorporated by reference in its entirety for all purposes.

BACKGROUND

The disclosure relates generally to wireless communication, and, more particularly, transmitter/receiver isolation and phase shifting in wireless communication devices. The electronic device may include a phased array system, including antennas shared between a transmitter and a receiver of the electronic device. However, sharing antennas between the transmitter and receiver may result in lower signal quality and may negatively impact the linearity of the phased array system.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a transceiver may include a transmitter, a receiver, and isolation and phase-shifting circuitry. The transmitter may include a first inductor while the receiver may include a second inductor. The isolation and phase-shifting circuitry may include a first switch that couples processing circuitry to a first end of the first inductor of the transmitter; a second switch that couples the processing circuitry to a second end of the first inductor of the transmitter; a third switch that couples the processing circuitry to a first end of the second inductor of the receiver; and a fourth switch that couples the processing circuitry to a second end of the second inductor of the receiver.

In another embodiment, a phased array system may include transmit circuitry having a power amplifier; at least one phase shifter that shifts a phase of a signal input to the power amplifier; and a switching network. The switching network may include a first switch and a first shunt switch that couple a processor to a first end of an inductor of the power amplifier; and a second switch and a second shunt switch configured to couple the processor to a second end of the inductor of the power amplifier.

In yet another embodiment, a method may include receiving an indication to receive a signal from a receiver; activating a first switch to couple processing circuitry to a first end of an inductor of the receiver and deactivating a second switch to decouple the processing circuitry from a second end of the inductor to apply a first phase shift to the signal; and activating the second switch to couple the processing circuitry to the second end of the inductor and deactivating the first switch to decouple the processing circuitry from the first end of the inductor to apply a second phase shift to the signal.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
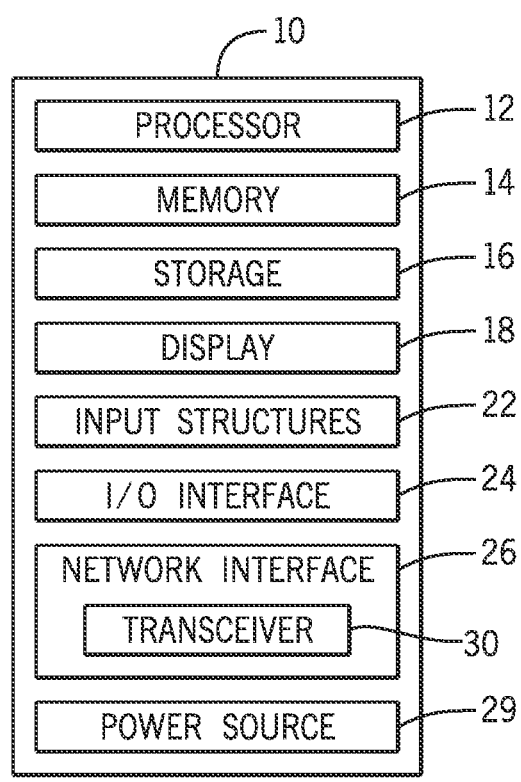
FIG. 1 is a block diagram of an electronic device, such as user equipment, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about", and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

This disclosure is directed to isolation circuitry and phase shifting in a transceiver within a phased array system of a wireless communication device (e.g., user equipment). The transceiver may include a transmitter and a receiver. In certain embodiments, the transmitter and the receiver may share the same antennas, which may reduce the size of the phased array system. The smaller phased array system may result in less space consumed on a printed circuit board (PCB) or integrated circuit (IC), as well as reduced design complexity and greater reciprocity of the phased array system. Reciprocity, as used herein, is defined as the conservation of voltage between the input and output of a node or port in the phased array system.

The transmitter and the receiver may also share the same phase shifters. Phase shifters may be passive or active microwave devices used to change the phase angle of a radio frequency (RF) signal. Phase shifters may be used for applications such as phase modulators, frequency up-converters, testing instruments, or phased array antennas within a phased array system. In order to use one set of antennas and one set of phase shifters for both the transmitter and the receiver, transmit/receive (T/R) switches may be implemented. The T/R switches may connect a common antenna or set of antennas to either the transmitter or receiver. In a transmit (TX) mode, the T/R switches may enable a TX path, allowing a transmission signal to be sent from a processor (e.g., a baseband processor) to the transmitter, while in a receive (RX) mode the T/R switches may enable an RX path, allowing a received signal to be sent from the receiver to the processor. While the T/R switches may enable the receiver and transmitter to share the antennas and phase shifters, they may also increase the overall insertion loss of the system, which may result in a lower signal quality (e.g., by increasing the noise figure (NF) of the system) and may negatively impact the linearity of the system.

As previously stated, phase shifters may be passive (e.g., consume no or negligible power) or active (e.g., consume power). Passive phase shifters may be advantageous due to their power saving attributes. In particular, a switch-based phase shifter (e.g., a phase shifter consisting of multiple phase shifting stages) may be advantageous due to its ability to provide large bandwidths and relatively low insertion loss. However, while insertion loss in the switch-based phase shifter is relatively low, the insertion loss may increase as additional stages are added to the phase shifter. For example, if a system requires a phase shift of 45 degrees, a phase shift of 90 degrees, and a phase shift of 180 degrees, each phase shifting stage may compound the amount of insertion loss. The increase in insertion loss due to the additional T/R switches and the increase in insertion loss experienced in each stage of the switch-based phase shifter may be reduced or minimized by implementing a circuit that combines the functionality of the phase shifter with the functionality of the T/R switch, thus reducing the number of T/R switches and phase shifter stages responsible for the increased insertion loss in the phased array transceiver circuitry.

Embodiments herein provide various apparatuses and techniques to reduce insertion loss while decreasing or minimizing the space consumed on an integrated circuit, PCB, and/or the device overall by integrating one or more phase shifters with one or more T/R switches in a phased array transceiver circuit. To do so, the embodiments disclosed herein include a transmitter and a receiver, each including one or more differential amplifiers (e.g., differential operational amplifiers) coupled to a first inductor, and a switching network coupled to a second inductor and one or more phase shifting circuitries. The differential amplifiers may be used in a multistage receiver, such as a multistage low-noise amplifier (LNA) and/or a multistage transmitter, such as a multistage power amplifier (PA) in an RF/millimeter wave (mmWave) circuit. A differential interface of the differential amplifier may enable the integration of a stage of the switch-based phase shifter (e.g., the 180 degree stage) with the differential ports of the LNA and PA, such that a single circuit may operate as the phase shifter and as the T/R switch. The T/R switch/phase shifter circuitry may include multiple sets of switches (e.g., a switching network). In a TX mode, the LNA may be deactivated or effectively removed from the circuit (e.g., all switches coupled to the LNA are open), while at least one set of switches coupled to the PA may be closed. One set of switches in the T/R switch/phase shifter circuitry coupled to the PA may be closed in order to produce a 0 degree phase shift in the signal transmitted by the PA, while another set of switches may be closed in order to produce a 180 degree phase shift in the signal transmitted by the PA. Likewise, in an RX mode, the PA may be deactivated or effectively removed from the circuit (e.g., all switches coupled to the PA are open), while at least one set of switches coupled to the LNA may be closed. One set of switches in the T/R switch/phase shifter circuitry coupled to the LNA may be closed in order to produce a 0 degree phase shift in the signal received by the LNA, while another set of switches may be closed in order to produce a 180 degree phase shift in the signal received by the LNA. This implementation may reduce the number of T/R switches and phase shifter stages in the phased array system, reducing the overall insertion loss experienced by the phased array system.

With the foregoing in mind, FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, for a local area network (LAN) or wireless local area network (WLAN), such as a network employing one of the IEEE 802.11x family of protocols (e.g., WI-FTC)), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the electronic device 10 may include any suitable source of power, such as a rechargeable lithium polymer (Li-poly) battery and/or an alternating current (AC) power converter.

Figure 2:
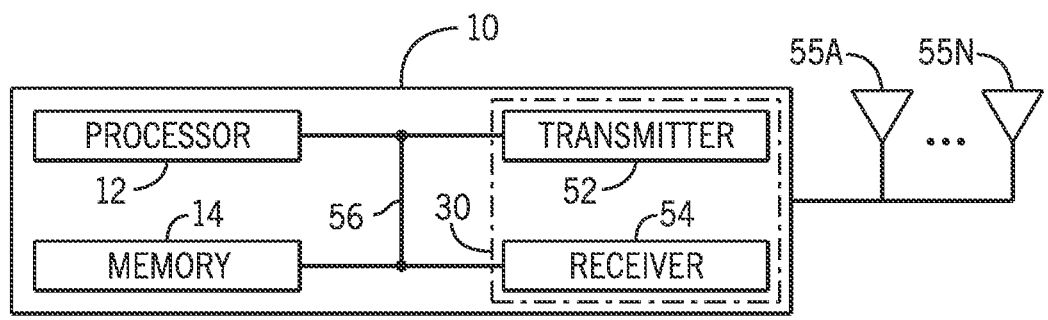
FIG. 2 is a functional block diagram of the electronic device of FIG. 1, according to an embodiment of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
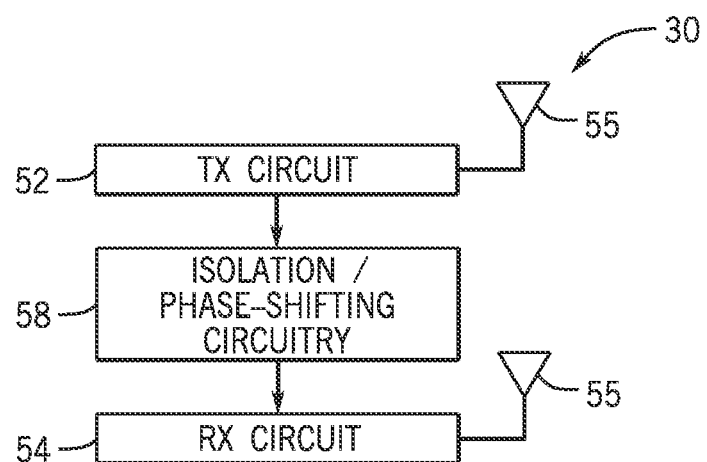
FIG. 3 is a simplified block diagram of a transceiver of the electronic device of FIG. 1 having a transmitter and a receiver separated by isolation/phase-shifting circuitry, according to an embodiment of the present disclosure.

FIG. 3 is a block diagram of the transceiver 30 (e.g., transceiver circuitry) of the electronic device 10, according to embodiments of the present disclosure. As illustrated, the transceiver circuitry 30 includes isolation/phase-shifting circuitry 58 disposed between a transmitter (e.g., a transmit circuit 52) and a receiver (e.g., a receive circuit 54). The isolation/phase-shifting circuitry 58 is communicatively coupled to the transmitter 52 and the receiver 54, and the transmitter 52 and the receiver 54 are coupled to one or more antennas 55. The isolation/phase-shifting circuitry 58 blocks the signals from passing from the transmitter 52 through to the receiver 54, and blocks the received signals from passing from the receiver 54 through to the transmitter 52. The isolation/phase-shifting circuitry 58 may also shift phases of the signals, as will be described in further detail below.

Figure 4:
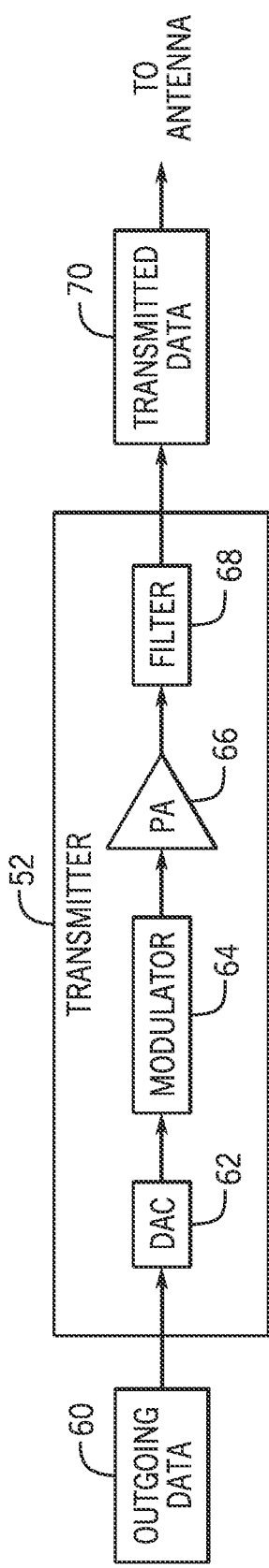
FIG. 4 is a schematic diagram of the transmitter of FIG. 3, according to an embodiment of the present disclosure.

FIG. 4 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted data 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

Figure 5:
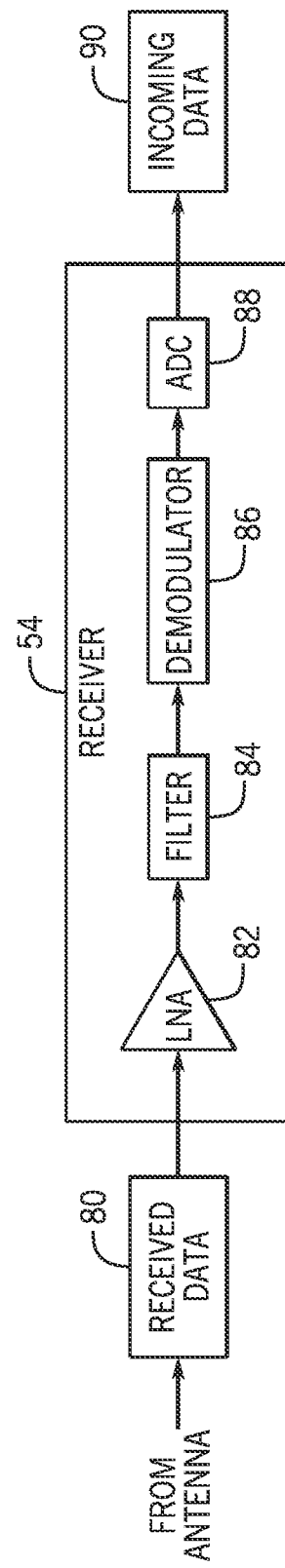
FIG. 5 is a schematic diagram of a receiver of FIG. 3, according to an embodiment of the present disclosure.

FIG. 5 is a schematic diagram of the receiver 54 (e.g., receive circuitry), according to embodiments of the present disclosure. As illustrated, the receiver 54 may receive received data 80 from the one or more antennas 55 in the form of an analog signal. A low noise amplifier (LNA) 82 may amplify the received analog signal to a suitable level for the receiver 54 to process. A filter 84 (e.g., filter circuitry and/or software) may remove undesired noise from the received signal, such as cross-channel interference. The filter 84 may also remove additional signals received by the one or more antennas 55 that are at frequencies other than the desired signal. The filter 84 may include any suitable filter or filters to remove the undesired noise or signals from the received signal, such as a bandpass filter, a bandstop filter, a low pass filter, a high pass filter, and/or a decimation filter. A demodulator 86 may remove a radio frequency envelope and/or extract a demodulated signal from the filtered signal for processing. An analog-to-digital converter (ADC) 88 may receive the demodulated analog signal and convert the signal to a digital signal of incoming data 90 to be further processed by the electronic device 10. Additionally, the receiver 54 may include any suitable additional components not shown, or may not include certain of the illustrated components, such that the receiver 54 may receive the received data 80 via the one or more antennas 55. For example, the receiver 54 may include a mixer and/or a digital down converter.

Figure 6:
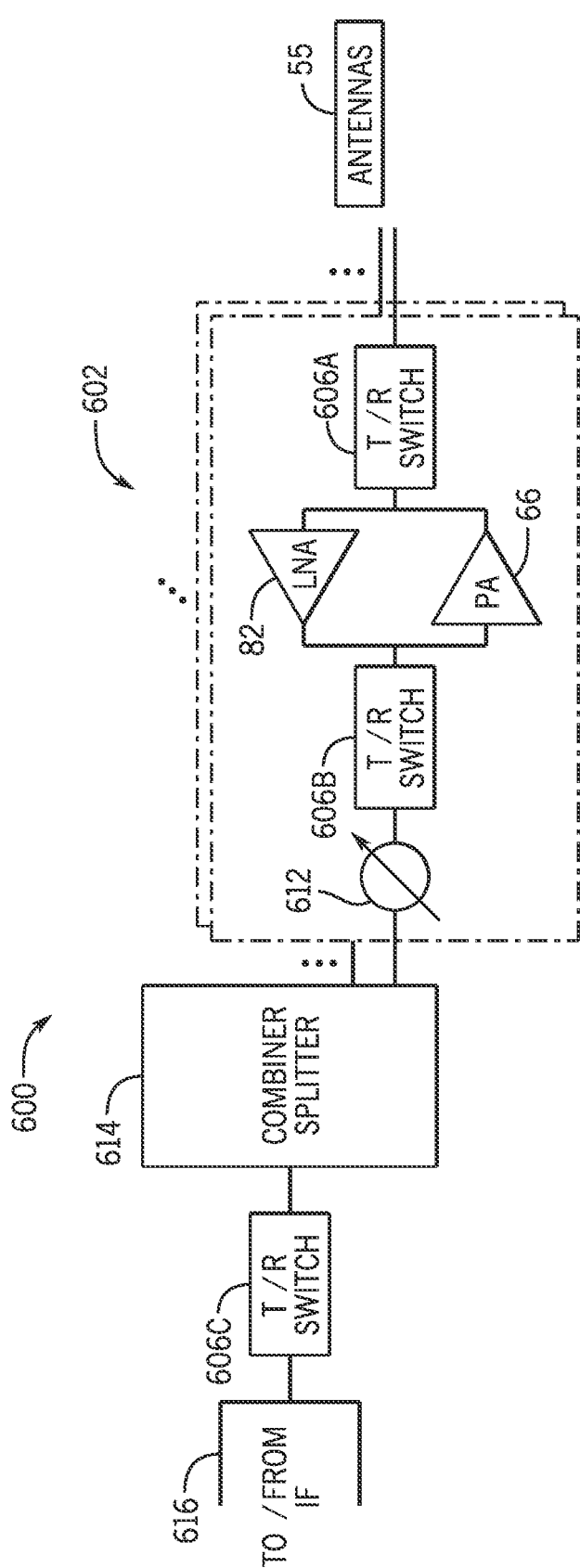
FIG. 6 is a schematic diagram of an example phased array system wherein the transmitter and the receiver of FIG. 3 share antennas.

FIG. 6 is a schematic diagram of an example phased array system 600 wherein the receiver 54 and the transmitter 52 share antennas. In order to use one set of antennas and one set of phase shifters for both the transmitter and the receiver, T/R switches 606 may be implemented. The phased array system 600 may include transmit/receive (T/R) circuitry 602, which may send signals to and receive signals from the antennas 55. For example, in a receive mode, the T/R switch 606A may receive a received signal from the antennas and pass the received signal to the LNA 82 (which may be representative of the receiver 54 as a whole). The received signal may pass, via the T/R switch 606B, to a phase shifter 612, which may adjust the phase of the received signal by a predetermined phase angle (e.g., 45 degrees, 90 degrees, 180 degrees, and so on). The received signal may then pass to a combiner/splitter 614. The T/R switch 606C may then enable the received data 80 to pass to an intermediate frequency (IF) port 616. As may be appreciated, the T/R switches 606A, 606B, and 606C, when flipped to a transmit mode, may enable a transmit signal to propagate from the IF port 616 through the PA 66 and to the antennas 55. While two T/R circuitries 602 are shown, it should be noted that the phased array system 600 may have any suitable number of T/R circuitries 602 (e.g., one, two, ten, one hundred, or several hundred).

As illustrated in FIG. 6, for the LNA 82 and the PA 66 to share the same antennas 55, the example phased array system 600 may implement three T/R switches 606A, 606B, and 606C. The T/R switches 606 may each contribute to an increase in the overall insertion loss of the phased array system 600. Increased insertion loss may result in a lower signal quality (e.g., by increasing the noise figure (NF) of the system) and may negatively impact the linearity of the system. By reducing the number of T/R switches 606, the insertion loss may be decreased.

Figure 7:
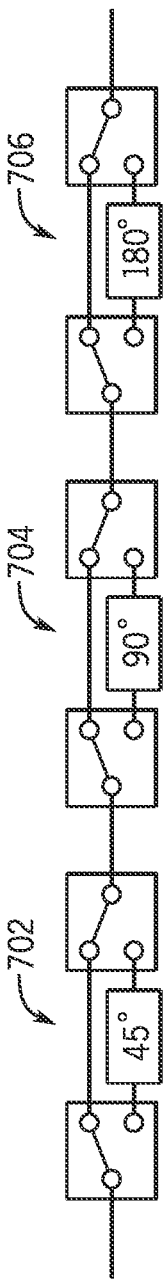
FIG. 7 is a schematic diagram of an example switch-based phase shifter of the phased array system of FIG. 6.

FIG. 7 is a schematic diagram of a switch-based phase shifter 700, according to an embodiment of the present disclosure. Phase shifters (e.g., 612) may be passive (e.g., consume no or negligible power) or active (consume power). Passive phase shifters such as the switch-based phase shifter 700 may be advantageous due to their power saving attributes. In particular, the switch-based phase shifter 700 having multiple phase shift stages (e.g., 702, 704, and 706) may be advantageous due to its ability to provide large bandwidths and relatively low insertion loss. However, while insertion loss in any one stage of the switch-based phase shifter 700 is relatively low, the insertion loss may increase as additional stages are added. For example, if the switch-based phase shifter 700 includes a 45 degree phase shift stage 702, a 90 degree phase shift stage 704, and a 180 degree phase shift stage 706, each stage may cause some amount of insertion loss, and the overall insertion loss of the switch-based phase shifter 700 may be compounded. For example, the insertion loss due to a phase shift of 135 degrees (e.g., provided by activating the 45 degree phase shift stage 702 and the 90 degree phase shift stage 704) may have a smaller corresponding insertion loss than a phase shift of 315 (e.g., provided by activating the 45 degree phase shift stage 702, the 90 degree phase shift stage 704, and the 180 degree phase shift stage 180). The increase in insertion loss due to the additional T/R switches 606 and the increase in insertion loss experienced in each stage of the switch-based phase shifter may be reduced or minimized by implementing a circuit that integrates one or more stages of the switch-based phase shifter 700 with the functionality of the T/R switch 606, thus reducing the number of T/R switches 606 and removing one or more stages of the switch-based phase shifter 700 that may be responsible for the increased insertion loss in the phased array system 600.

Figure 8A:
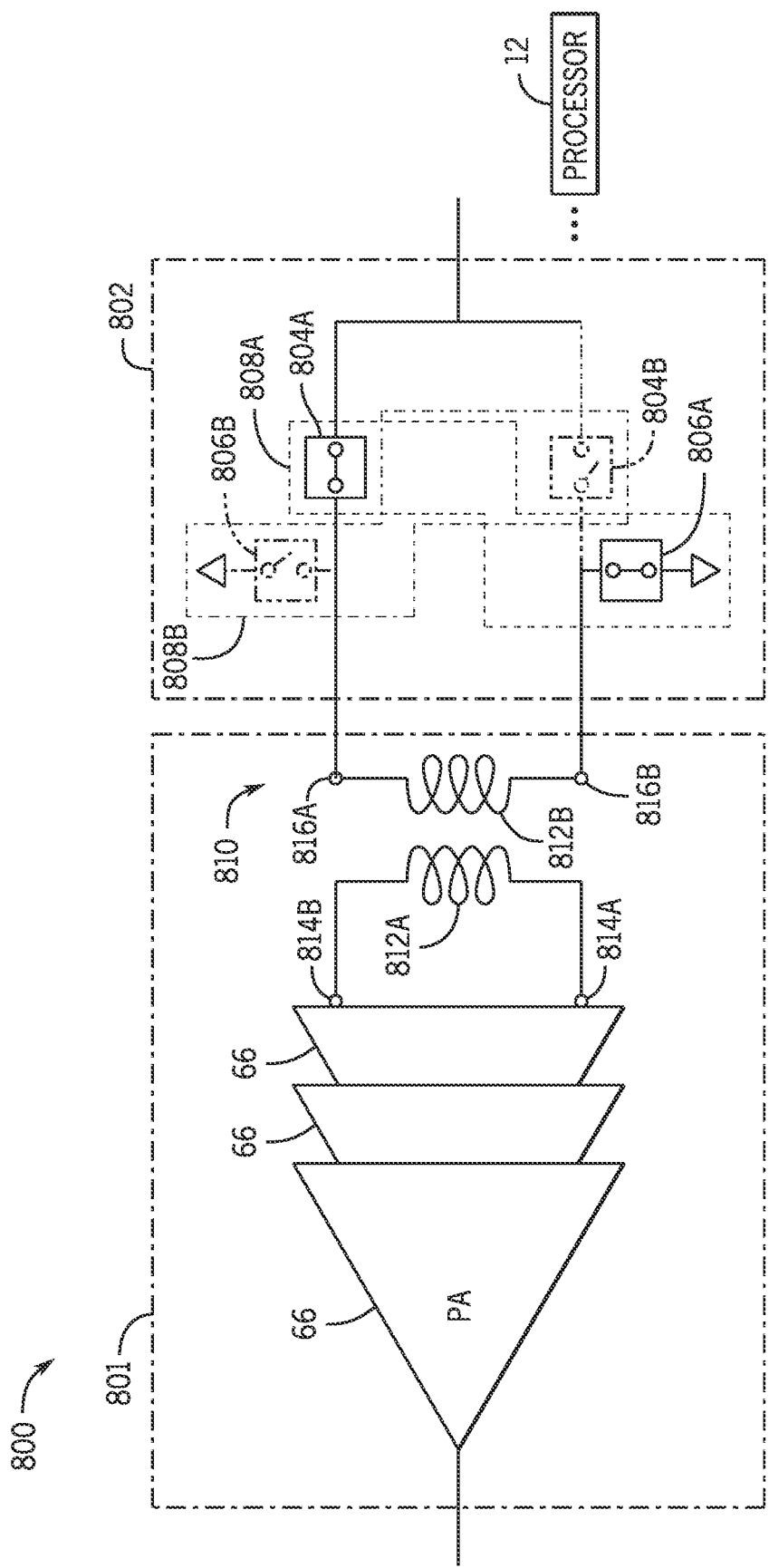
FIG. 8A is a schematic diagram of the transmitter of FIG. 4 having a multistage power amplifier and a switching network arranged to shift the phase of a transmit signal by a phase angle, according to an embodiment of the present disclosure.

FIG. 8A is a schematic diagram of transmit circuitry 800 (e.g., of the transmitter 52) having a multistage PA 801 and a switching network 802 arranged to shift the phase of a transmit signal by 0 degrees, according to an embodiment of the present disclosure. The multistage PA 801 may be a differential power amplifier (e.g., a differential operational amplifier) including multiple PAs 66 and an transformer 810; the transformer 810 including an inductor 812A and an inductor 812B. The switching network 802 includes switches 804A and 804B and shunt switches 806A and 806B. The switch 804A and the shunt switch 806A may together make a set 808A, while the switch 804B and the shunt switch 806B may together make a set 808B. When the set 808A is activated (e.g., the switch 804A and the shunt switch 806A are closed) and the set 808B is deactivated (e.g., the switch 804B and the shunt switch 806B are open), the activated switching network 802 may carry a transmit signal from the processor 12 to a differential port 814A of the multistage PA 801 by coupling the processor 12 to a first end 816A of the inductor 812B of the transformer 810, which inductively transfers the transmit signal from the inductor 812B to the inductor 812A coupled to the differential port 814A of the multistage PA 801. The activated shunt switch 806A may short the second end 816B of the inductor 812B (e.g., transforming the differential signal to a single-ended signal as the second end 816B may be grounded). By enabling the processor 12 to couple to the differential port 814A of the multistage PA 801, the switching network 802 may maintain a phase of a transmit signal going to the multistage PA 801, or shift the phase of the transmit signal going to the multistage PA 801 by 0 degrees.

Figure 8B:
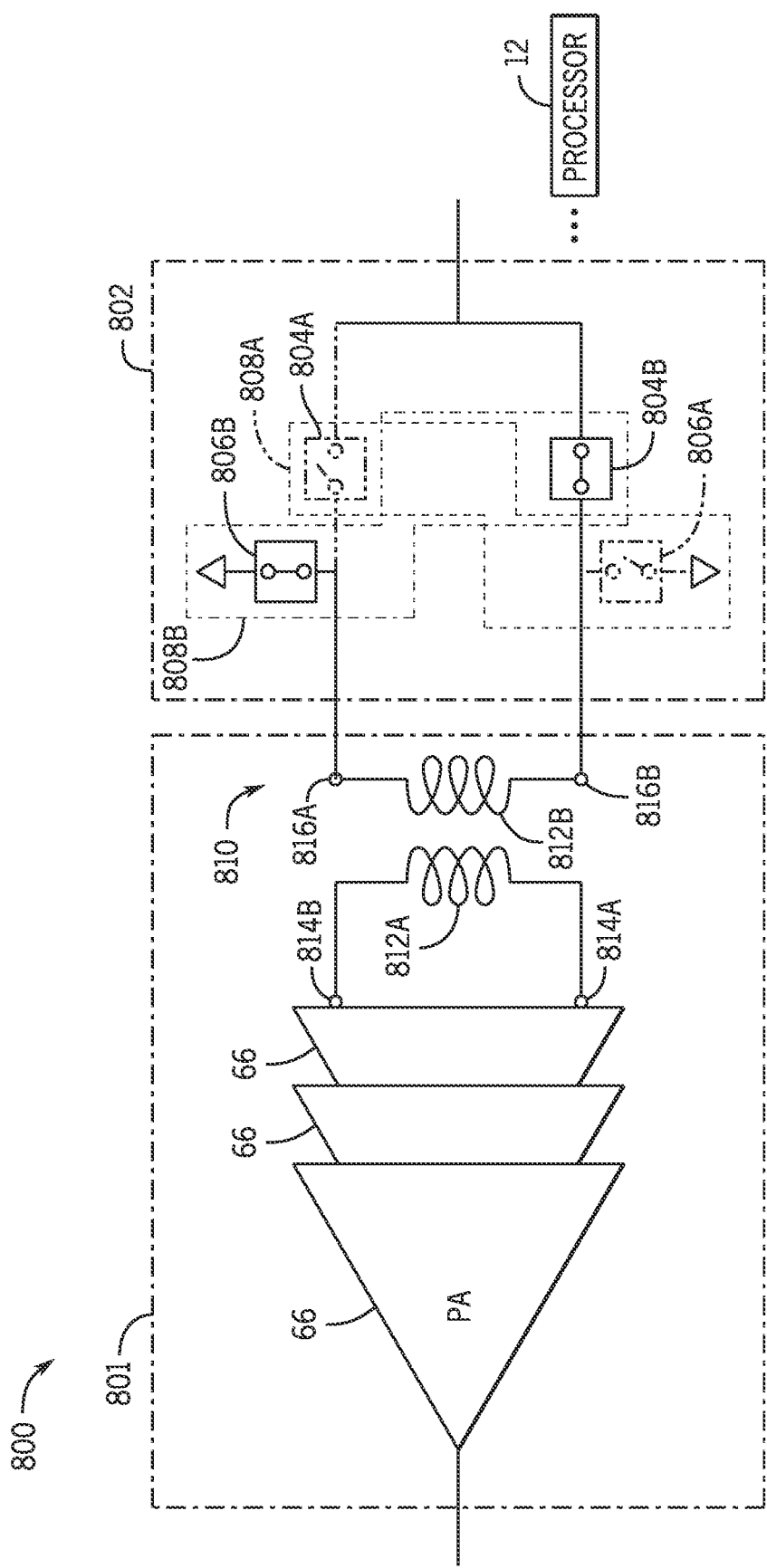
FIG. 8B is a schematic diagram of the transmitter of FIG. 4 having a multistage PA and a switching network arranged to shift the phase of a transmit signal by another phase angle, according to an embodiment of the present disclosure.

FIG. 8B is a schematic diagram of the transmit circuitry 800 having a multistage PA 801 and a switching network 802 arranged to produce a 180 degree phase shift, according to an embodiment of the present disclosure. When the set 808B of the switching network 802 is activated (e.g., the switch 804B and the shunt switch 806B are closed) and the set 808A is deactivated (e.g., the switch 804A and the shunt switch 806A are open) the processor 12 may couple to a differential port 814B of the multistage PA 801 by coupling to the second end 816B of the inductor 812B. Coupling the processor 12 to the differential port 814B of the multistage PA 801 may cause the transmit signal to swap polarity, inverting the transmit signal sent from the multistage PA 801 causing the phase of the transmit signal to be offset by 180 degrees (e.g., resulting in a 180 degree phase shift in FIG. 8A) in the signal going to the multistage PA 801. The activated shunt switch 806B may short the first end 816A of the inductor 812B (e.g., transforming the differential signal to a single-ended signal as the first end 816A may be grounded).

By using the switching network 802 to shift the phase of the transmit signal, a phase shifter (e.g., the 180 degree phase shift stage 706 of FIG. 7) may be removed from the switch-based phase shifter 700 (as evidenced in the switching network 802), thus reducing the insertion loss in a phased array system (e.g., 600). In the following embodiments, it will be discussed how switching networks similar to the switching network 802 may be used to integrate a stage (e.g., the 180 degree phase shift stage 706) of the switch-based phase shifter 700 and a T/R switch 606. Additionally, while FIGS. 8A and 8B illustrate the switching network 802 producing different phase shifts for the multistage PA 801, it should be noted that a switching network similar to the switching network 802 may be implemented to produce one or more phase shifts in a signal coming from the LNA 82 (e.g., a multistage LNA).

Figure 9:
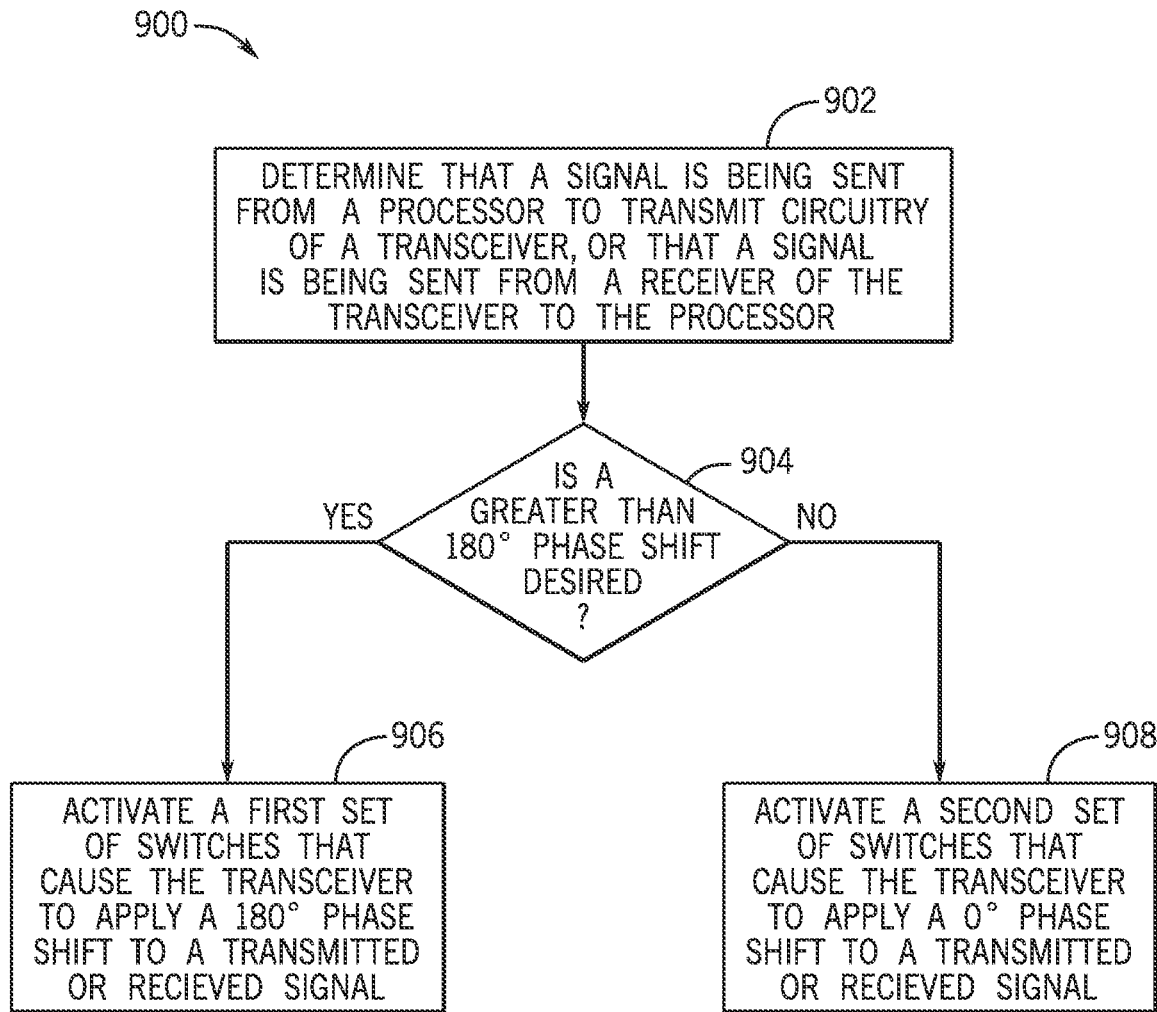
FIG. 9 is a flowchart of a method for selectively applying a phase shift according to an embodiment of the present disclosure.

FIG. 9 is a flowchart of a method 900 for applying a phase shift using the transmit circuitry 800, according to an embodiment of the present disclosure. Any suitable device (e.g., a controller) that may control components of the electronic device 10, such as the processor 12, may perform the method 900. In some embodiments, the method 900 may be implemented by executing instructions stored in a tangible, non-transitory, computer-readable medium, such as the memory 14 or storage 16, using the processor 12. For example, the method 900 may be performed at least in part by one or more software components, such as an operating system of the electronic device 10, one or more software applications of the electronic device 10, and the like. While the method 900 is described using steps in a specific sequence, it should be understood that the present disclosure contemplates that the described steps may be performed in different sequences than the sequence illustrated, and certain described steps may be skipped or not performed altogether.

In process block 902 the processor 12 determines that a signal is being sent from the processor 12 to transmit circuitry (e.g., including the PA 66) of the transceiver 30 or determines that a signal is being sent from receive circuitry (e.g., including the LNA 82) of the transceiver 30 to the processor 12. In decision block 904, the processor 12 may determine whether a phase shift of greater than 180 degrees is desired. If the processor 12 determines that a phase shift of greater than 180 degrees is desired, then, in process block 906, the processor 12 activates a first set of switches (e.g., the set 808B) that causes the transceiver 30 to apply a 180 degree phase shift to a transmitted or received signal. For example, if the processor 12 determines that a 225 degree phase shift is desired for a transmit signal, then the processor 12 may activate a 45 degree phase shifter and the set 808B (e.g., that couples the processor 12 to the first end 816A of the inductor 812B), combining the 45 degree phase shift with the 180 degree phase shift to shift the phase of the transmit signal by 225 degrees.

However, if the processor 12 determines that a phase shift greater than 180 degrees is not desired, then, in process block 908, the processor 12 activates a second set of switches (e.g., the set 808B) that cause the transceiver to apply a 0 degree phase shift to a transmitted or received signal. For example, if the processor 12 determines that a 135 degree phase shift is desired, then the processor 12 may activate the 45 degree phase shifter, a 90 degree phase shifter, and the set 808A, producing a 135 degree phase shift. In this manner, the method 900 enables the processor 12 to apply a phase shift to an input (e.g., transmission) signal. While the method 900 of FIG. 9 describes shifting the phase of the transmit signal going to the multi-stage PA 801 as illustrated in FIG. 8A and FIG. 8B, the method 900 may also apply to a received signal coming from an LNA (e.g., 82), as will be discussed in greater detail below.

Figure 10A:
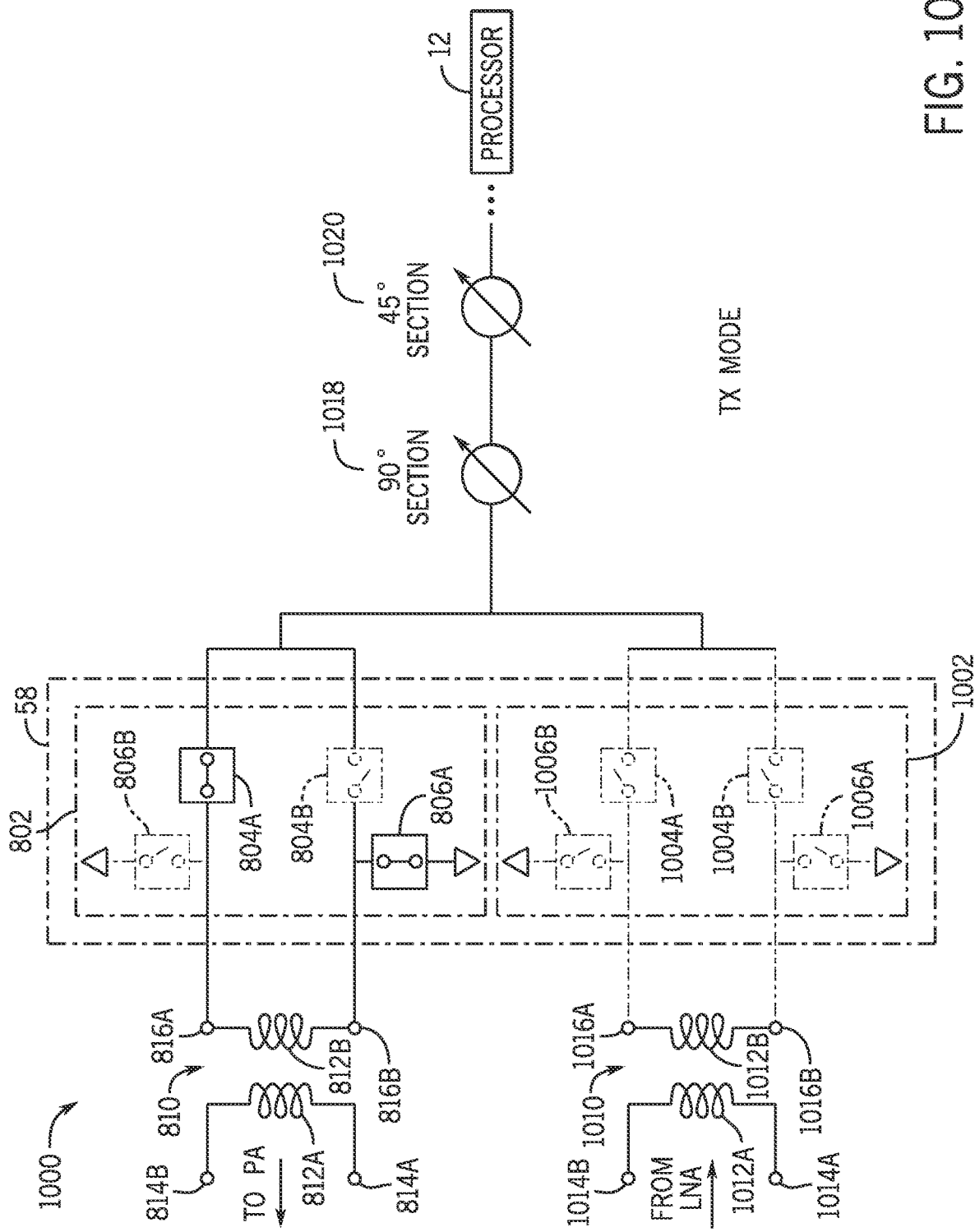
FIG. 10A is a schematic diagram of the transceiver circuitry of FIG. 3 with isolation/phase-shifting circuitry shifting a phase of a transmit signal, according to an embodiment of the present disclosure.

FIG. 10A is a schematic diagram of transceiver circuitry 1000 having switches of the isolation/phase-shifting circuitry 58 configured so as to shift the phase of a transmit signal, according to an embodiment of the present disclosure. The transceiver circuitry 1000 includes the PA 66 (which is representative of the transmitter 52), the LNA 82 (which is representative of the receiver 54), and the isolation/phase-shifting circuitry 58, which further includes the switching network 802 and a switching network 1002. The switching network 802 may, as illustrated in FIG. 8A and FIG. 8B, shift the phase of a signal going to the PA 66 by 0 degrees (e.g., by activating the switch 804A and the shunt switch 806A and deactivating the switch 804B and the shunt switch 806B) or 180 degrees (e.g., by activating the switch 804B and the shunt switch 806B and deactivating the switch 804A and the shunt switch 806A). The switching network 1002 may shift the phase of a signal coming from the LNA 82 by 180 degrees or 0 degrees. The switching network 1002 includes switches 1004A and 1004B and shunt switches 1006A and 1006B. As illustrated, the switching network 802 is activated and the switching network 1002 is deactivated (e.g., the switches 1004A and 1004B and the shunt switches 1006A and 1006B are open), thus the transceiver circuitry 1000 is in a transmit (TX) mode. As the switch 804A and the shunt switch 806A are activated and the switch 804B and the shunt switch 806B are deactivated, the isolation/phase-shifting circuitry 58 may couple the processor 12 to the first end 816A of the inductor 812B, which may inductively transfer the transmit signal from the inductor 812B to the inductor 812A coupled to the differential port 814A of the PA 66, maintaining the phase of the transmit signal or shifting the phase of the transmit signal by 0 degrees.

The isolation/phase-shifting circuitry 58 and the switching network 1002 may enable the processor 12 to couple to a differential port 1014A or a differential port 1014B of the LNA 82 by coupling the processor to a first end 1016A or a second end 1016B an inductor 1012A of the transformer 1010. When the switch 1004A and the shunt switch 1006A are activated (e.g., closed) and the switch 1004B and the shunt switch 1006B are deactivated (e.g., open) the processor 12 may couple to the differential port 1014A of the LNA 82, causing a phase shift (e.g., a 0 degree phase shift) in the signal coming from the LNA 82 Similarly, when the switch 1004B and the shunt switch 1006B are activated (e.g., closed) and the switch 1004A and the shunt switch 1006A are deactivated (e.g., open) the processor 12 may couple to a differential port 1014B of the LNA 82 and decouple from the differential port 1014A causing a phase shift (e.g., a 180 degree phase shift) in the signal coming from the LNA 82. The transceiver circuitry 1000 also includes a 45 degree phase shifter 1020 and a 90 degree phase shifter 1018. While only the 45 degree phase shifter 1020 and the 90 degree phase shifter 1018 are shown in the transceiver circuitry 1000, it should be noted that the transceiver circuitry 1000 may include fewer or more phase shifters that may apply any appropriate phase shift (e.g., a 30 degree phase shift, a 15 degree phase shift, and so on).

Figure 10B:
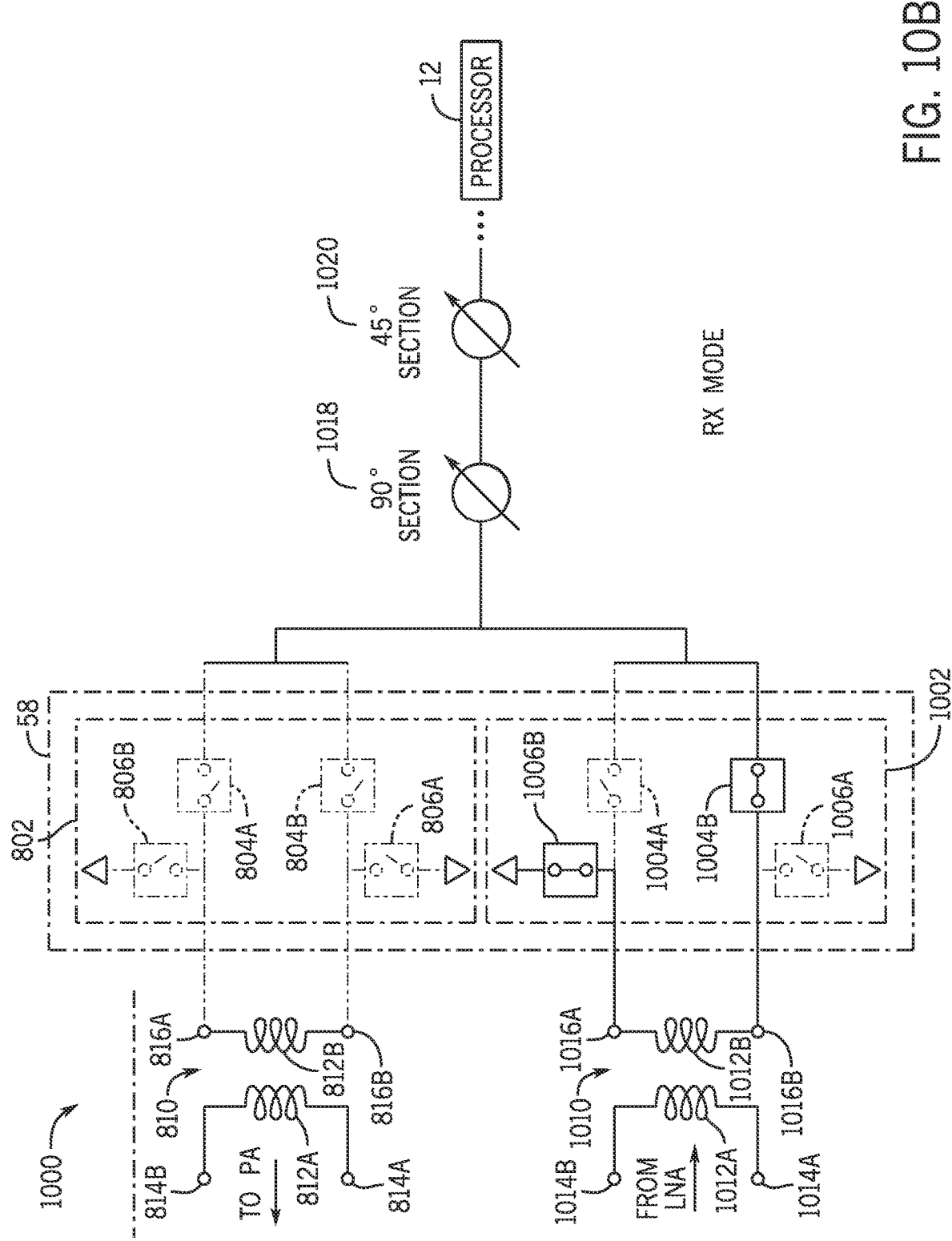
FIG. 10B is a schematic diagram of the transceiver circuitry of FIG. 3 with the isolation/phase-shifting circuitry shifting a phase of a received signal, according to an embodiment of the present disclosure.

As discussed, the transceiver circuitry 1000 in FIG. 10A is in a TX mode. FIG. 10B is a schematic diagram of the transceiver circuitry 1000 having the switches of the isolation/phase-shifting circuitry 58 configured so as to apply a phase shift to a received signal, according to an embodiment of the present disclosure. As may be observed, as the transceiver circuitry 1000 is in an RX mode. The switching network 802 is deactivated (e.g., all switches 804 and shunt switches 806 in the switching network 802 are open) and the switching network 1002 is activated (e.g., the switch 1004B and the shunt switch 1006B are closed). Activating the switch 1004B and the shunt switch 1006B and deactivating the switch 1004A and the shunt switch 1006A may cause the switching network 1002 to couple the processor 12 to a second end 1016B of the inductor 1012B, which may inductively transfer the received signal from the inductor 1012B to the inductor 1012A coupled to the differential port 1014B of the LNA 82, shifting the phase of the received signal by 180 degrees. In other embodiments, the switch 1004A and the shunt switch 1006A may be activated and the switch 1004B and the shunt switch 1006B may be deactivated to couple the processor 12 to the first end 1016A of the inductor 1012B. The inductor 1012B may inductively transfer the received signal from the inductor 102B to the inductor 1012A coupled to the differential port 1014A of the LNA 82, which may maintain the phase shift of the received signal or shift the phase of the received signal by 0 degrees.

Figure 11:
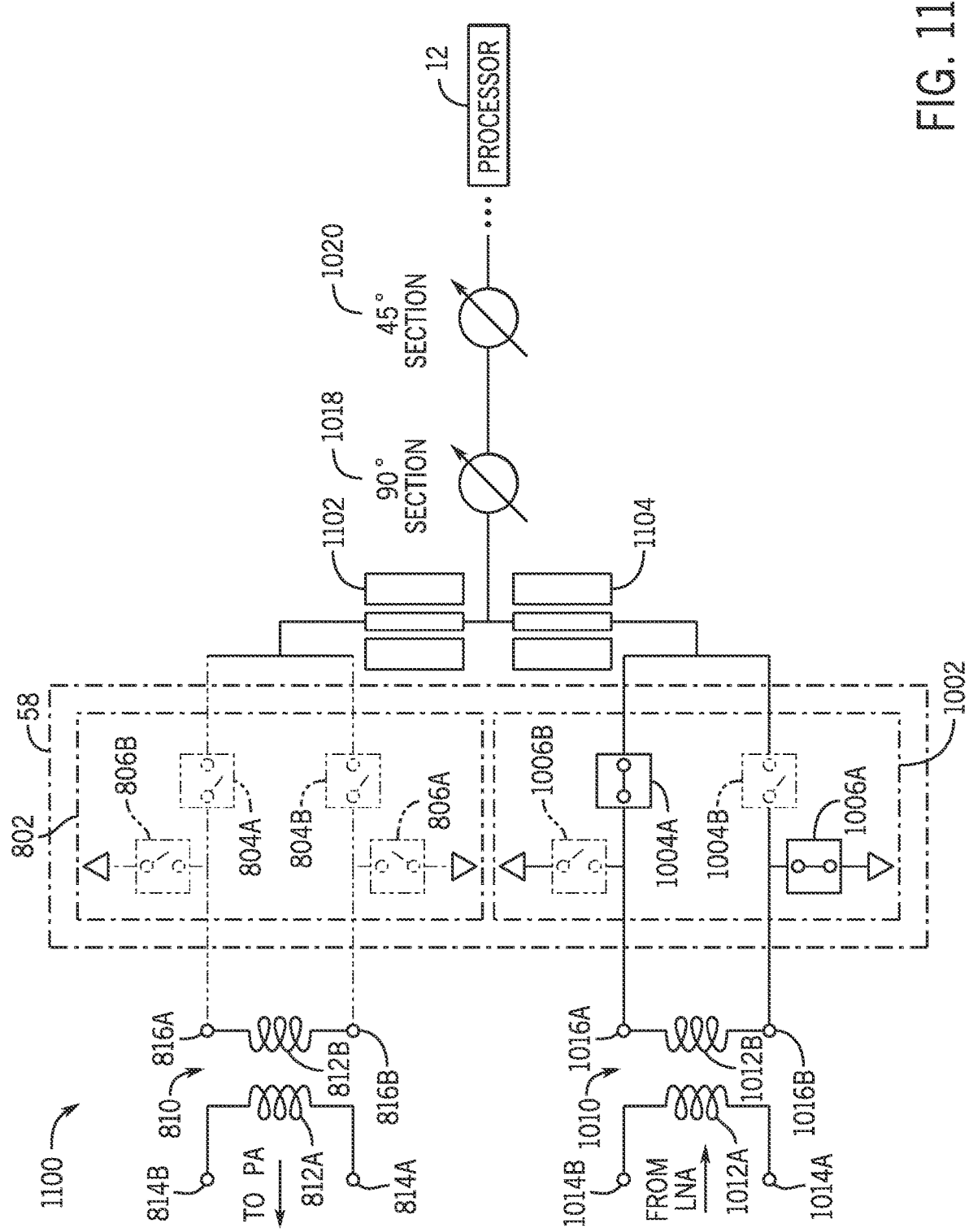
FIG. 11 is a schematic diagram of transceiver circuitry of FIG. 3 with the isolation/phase-shifting circuitry utilizing single-ended transmission lines, according to an embodiment of the present disclosure.

FIG. 11 is a schematic diagram of transceiver circuitry 1100 utilizing single-ended transmission lines, according to an embodiment of the present disclosure. The single-ended transmission line 1102 couples the switching network 802 to the phase shifters 1018 and 1020. The single-ended transmission line 1104 connects the switching network 1002 to the phase shifters 1018 and 1020. However, at certain frequencies (e.g., 30 gigahertz and higher), the single-ended transmission lines 1102 and 1104 may cause reactive energy (e.g., capacitive reactance) to accumulate at the deactivated switching network (e.g., the switching network 802 in the receive mode and the switching network 1002 in the transmit mode). For example, in FIG. 11, the transceiver circuitry 1100 is in an RX mode, thus the switching network 1002 is activated (e.g., one or more switches 1004 and one or more shunt switches 1006 are closed) and the switching network 802 is deactivated (e.g., the switches 804 and the shunt switches 806 are open). If the signal coming from the LNA 82 has a frequency of 50 gigahertz, excess reactive energy (e.g., in particular, excess capacitive reactance) may build up at the switching network 802; and the switching network 1002 may not be able to absorb the excess capacitive reactance. Embodiments that resolve or compensate for the excess capacitive reactance will be discussed below.

Figure 12:
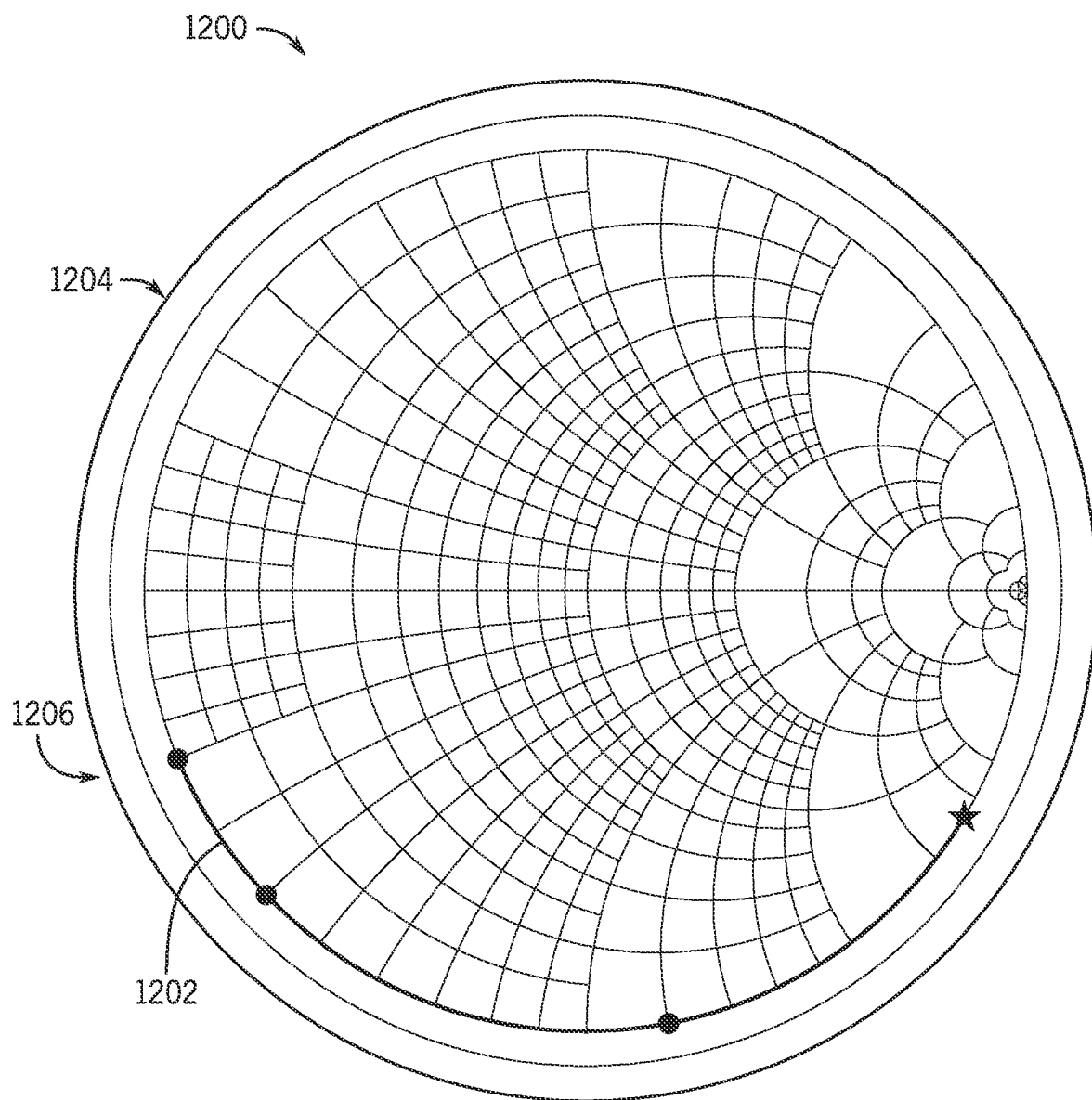
FIG. 12 is a Smith chart illustrating total impedance of the transceiver circuitry of FIG. 11, according to an embodiment of the present disclosure.

FIG. 12 is a Smith chart 1200 illustrating total impedance of the transceiver circuitry 1100, according to an embodiment of the present disclosure. The Smith chart 1200 illustrates impedance 1202 present at a deactivated switching network (e.g., 802 in FIG. 11) due to various components in the transceiver circuitry 1100 (e.g., the activated switching network 1002, the single-ended transmission lines 1102 and 1104, and so on). The top hemisphere 1204 of the Smith chart 1200 represents the inductive reactance of one or more component (e.g., the single-ended transmission lines 1102 and 1104) in the transceiver circuitry 1100. The bottom hemisphere 1206 represents the capacitive reactance of the one or more components in the transceiver circuitry 1100. The impedance 1202 indicates a significant buildup of capacitive reactance at the switching network 802 that may not be absorbed or dissipated by the rest of the transceiver circuitry 1100.

Figure 13:
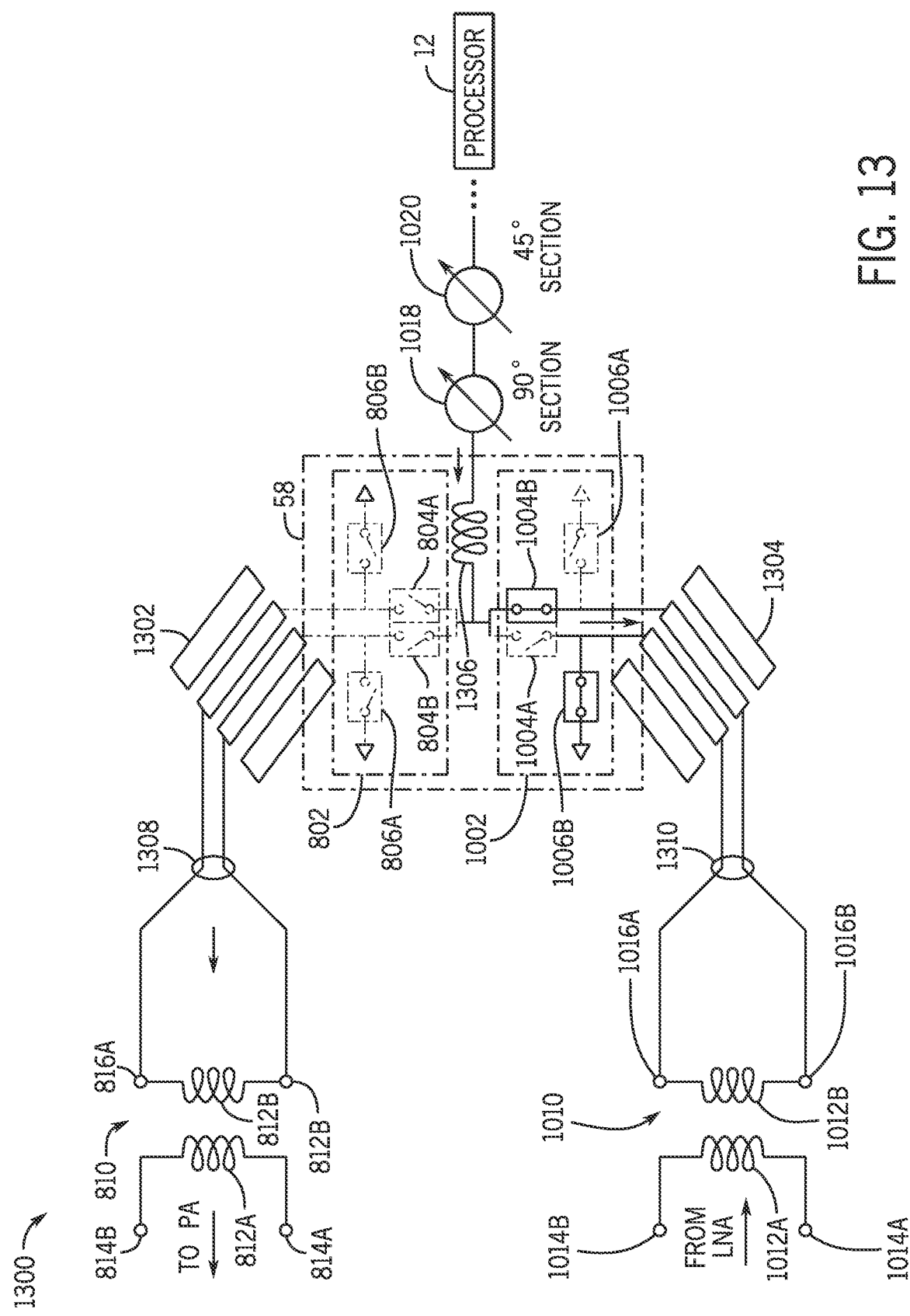
FIG. 13 is a schematic diagram of transceiver circuitry of FIG. 3 with the isolation/phase-shifting circuitry utilizing differential transmission lines and an additional inductor, according to an embodiment of the present disclosure.

FIG. 13 is a schematic diagram of transceiver circuitry 1300 utilizing differential transmission lines and an additional inductor, according to an embodiment of the present disclosure. To resolve the excess capacitive reactance issue for signals at the certain frequencies discussed above, the switching network 802 may be moved from an input port 1308 or near the input port 1308 of the PA 66 and repositioned between a differential transmission line 1302 and an inductor 1306. Similarly, the switching network 1002 may be moved from an input port 1310 or near the input port 1310 of the LNA 82 and repositioned between a differential transmission line 1304 and the inductor 1306. The shunt switches 806A and 806B may be 100 micrometers to 250 micrometers from an input port 1308 and/or the inductor 812B of the PA 66 and the shunt switches 1006A and 1006B may be 100 micrometers to 250 micrometers from an input port 1310 and/or the inductor 1012B of the LNA 82. By removing the single-ended transmission lines 1102 and implementing the differential transmission lines 1302 and 1304 in the transceiver circuitry 1300 and taking advantage of the differential nature of the differential transmission lines 1302 and 1304, the capacitive reactance at the deactivated switching network (e.g., 802 in FIG. 13) may be reduced rather that combined. Additionally, the inductor 1306 may dissipate all or a portion of the remaining capacitive reactance. To sufficiently dissipate the remaining capacitive reactance, the inductor 1306 may have a range of 100 picohenries to 150 picohenries.

Figure 14:
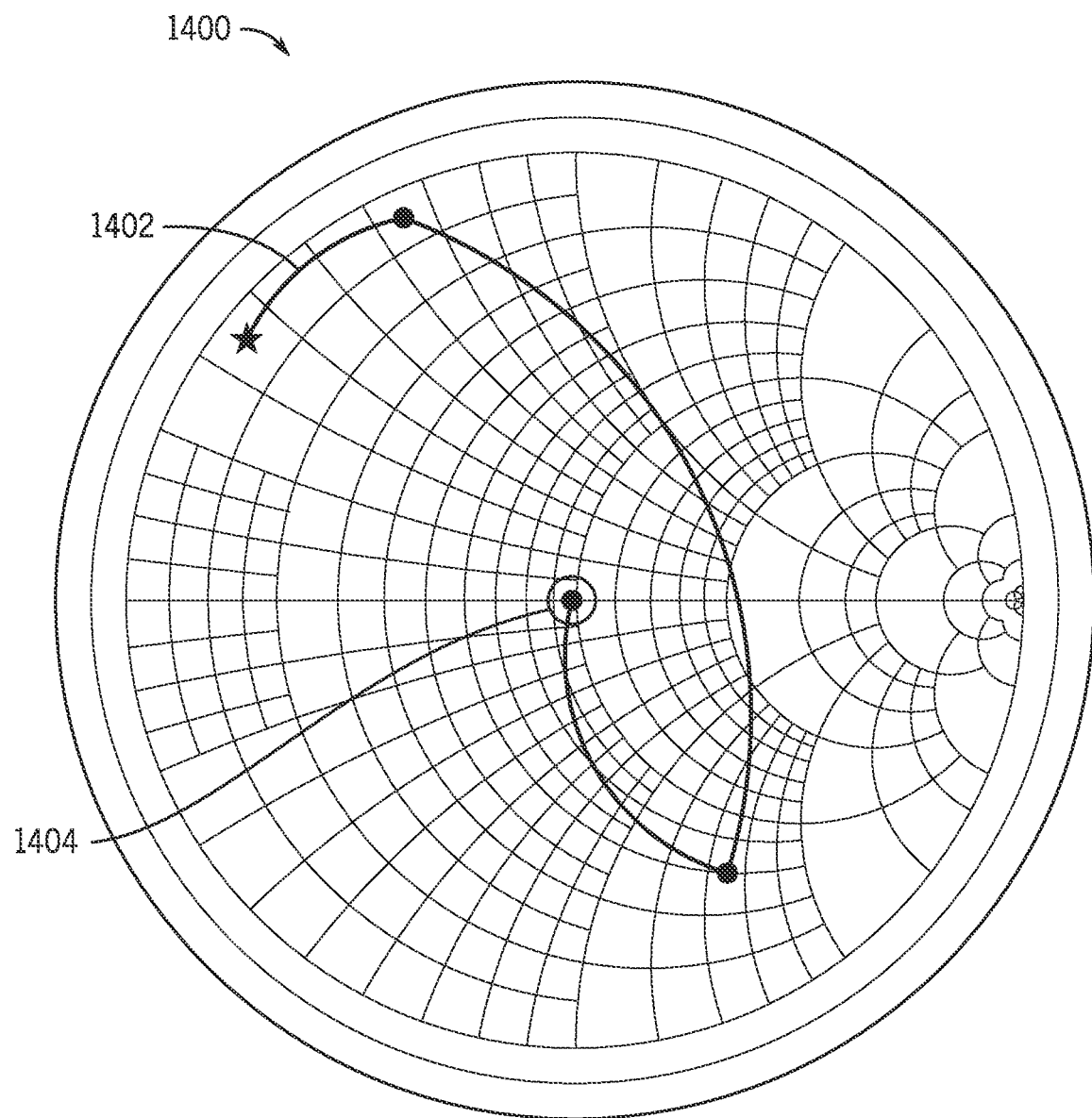
FIG. 14 is a Smith chart illustrating total impedance of the transceiver circuitry of FIG. 13, according to an embodiment of the present disclosure.

FIG. 14 is a Smith chart 1400 illustrating total impedance of the transceiver circuitry 1300, according to an embodiment of the present disclosure. The Smith chart 1400 illustrates an impedance 1402 within the transceiver circuitry 1300 due to components such as the differential transmission lines 1302 and 1304, the switching networks 802 and 1002, and the inductor 1306. As may be observed, the capacitive reactance of the impedance of the transceiver circuitry 1300 (e.g., the capacitive reactance at the differential port of the PA 66) has been reduced (e.g., is closer to a system impedance 1404).

Figure 15:
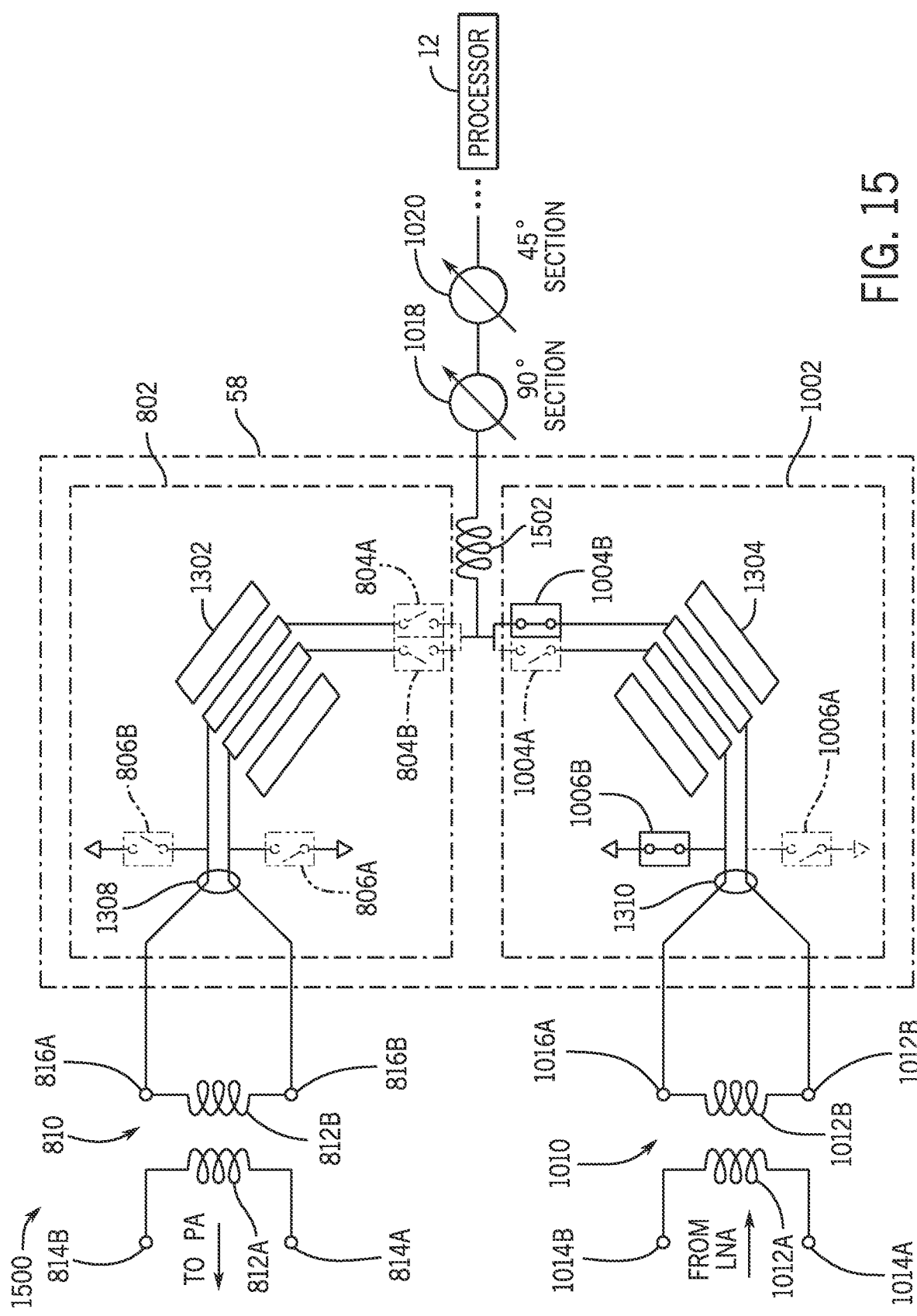
FIG. 15 is a schematic diagram illustrating an alternative embodiment to the transceiver circuitry in FIG. 13, according to an embodiment of the present disclosure.

FIG. 15 is a schematic diagram of transceiver circuitry 1500, wherein the transceiver circuitry 1500 is an alternative embodiment of the transceiver circuitry 1300, according to an embodiment of the present disclosure. The transceiver circuitry 1500 may be realized by moving the shunt switches 806A and 806B from the positions seen in FIG. 13 (e.g., 100 to 250 micrometers from the input port 1308 and/or the inductor 812B of the PA 66) and repositioning them at the input port 1308 or near the input port 1308 of the PA 66, such that the differential transmission lines 1302 are disposed between the shunt switches 806A and 806B and the switches 804A and 804B Similarly, the shunt switches 1006A and 1006B may be moved from the positions seen in FIG. 13 (e.g., 100 to 250 micrometers from the input port 1310 and/or the inductor 1012B of the LNA 82) and repositioned at the input port 1310 or near the input port 1310 of the LNA 82, such that the differential transmission lines 1304 are disposed between the shunt switches 1006A and 1006B and the switches 1004A and 1004B. By repositioning the shunt switches 806A, 806B, 1006A, and 1006B, the transceiver circuitry 1500 may further reduce the excess capacitive reactance accumulated at the deactivated switching network for signals at the certain frequencies (e.g., as seen in FIG. 11). Due to the decreased capacitive reactance, the transceiver circuitry 1500 may include an inductor 1502 that may be smaller than the inductor 1306. For example, while the inductor 1306 may have a range of 100 picohenries to 150 picohenries, the inductor 1502 may have a range of 20 picohenries to 30 picohenries. In one or more other embodiments, the inductor 1502 may be removed altogether. The arrangement of the transceiver circuitry 1500 may also further reduce the insertion loss experienced by the phased array system (e.g., by one-half dB).

Figure 16:
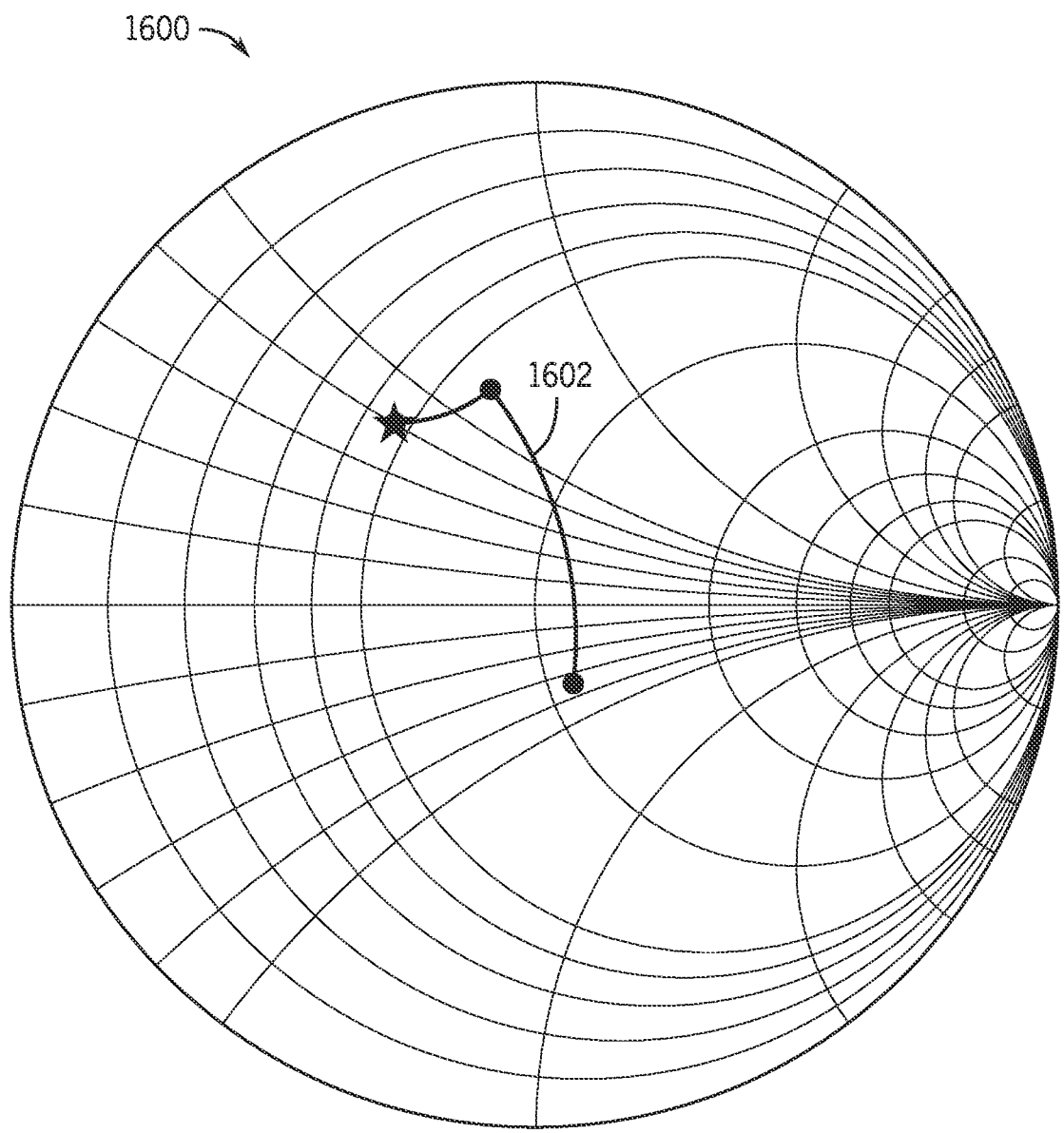
FIG. 16 is a Smith chart illustrating total impedance of the transceiver circuitry of FIG. 15, according to an embodiment of the present disclosure.

FIG. 16 is a Smith chart 1600 illustrating the total impedance of the transceiver circuitry 1500, according to an embodiment of the present disclosure. As may be observed, the impedance 1602 of the transceiver circuitry 1500 is less than that of the impedance 1402 of the transceiver circuitry 1300. Particularly, it may be observed that the capacitive reactance of the impedance 1602 is less than the capacitive reactance component of the impedance 1402. As previously stated, this smaller capacitive reactance component of the impedance 1602 may enable the transceiver circuitry 1500 to absorb the capacitive reactance at the deactivated switching network (e.g., the switching network 802 in FIG. 15) with the smaller inductor 1502 or with no inductor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specific embodiments described above have been shown by way of example, and it should be understood that

The invention claimed is:

1. A transceiver comprising:
   a first amplifier having a first signal input;
   a second amplifier having a second signal input;
   a first transformer electrically coupled to the first amplifier;
   a second transformer electrically coupled to the second amplifier;
   a first switching network having a first switch and a second switch, and being electrically coupled to the first transformer, the first switching network configured to activate the first switch to apply a first phase shift to the first signal input of the first amplifier, and activate the second switch to apply a second phase shift to the first signal input of the first amplifier; and
   a second switching network having a third switch and a fourth switch, and being electrically coupled to the second transformer, the second switching network configured to activate the third switch to apply the first phase shift to the second signal input of the second amplifier, and activate the fourth switch to apply the second phase shift to the second signal input of the second amplifier.

2. The transceiver of claim 1, wherein the first amplifier comprises a power amplifier.

3. The transceiver of claim 1, wherein the second amplifier comprises a low noise amplifier.

4. The transceiver of claim 1, wherein the first switch is configured to apply a 180 degree phase shift to the first signal input to the first amplifier.

5. The transceiver of claim 1, wherein the second switch is configured to apply a 0 degree phase shift to the first signal input to the first amplifier.

6. The transceiver of claim 1, wherein the third switch is configured to apply a 180 degree phase shift to the second signal input to the first amplifier.

7. The transceiver of claim 1, wherein the fourth switch is configured to apply a 0 degree phase shift to the second signal input to the first amplifier.

8. The transceiver of claim 1, comprising:
   a first transmission line coupled between the first transformer and the first switching network; and
   a second transmission line coupled between the second transformer and the second switching network.

9. The transceiver of claim 8, wherein the first transmission line, the second transmission line, or both comprise a differential transmission line.

10. The transceiver of claim 8, wherein the first transmission line, the second transmission line, or both comprise a single-ended transmission line.

11. A phased array system comprising:
    a transceiver comprising a transformer electrically coupled to an amplifier, the transformer comprising a first winding and a second winding; and
    phase shift circuitry comprising a switching network electrically coupled to the transformer, the switching network configured to activate a first switch and deactivate a second switch to couple processing circuitry to a first end of the first winding of the transformer to apply a first phase shift to a signal input to the amplifier, and activate the second switch and deactivate the first switch to couple the processing circuitry to a second end of the first winding of the transformer to apply a second phase shift to the signal input to the amplifier.

12. The phased array system of claim 11, wherein the amplifier comprises a power amplifier.

13. The phased array system of claim 11, wherein the amplifier comprises a low noise amplifier.

14. The phased array system of claim 11, wherein the first switch is configured to apply a 180 degree phase shift to the signal input to the amplifier.

15. The phased array system of claim 11, wherein the second switch is configured to apply a 0 degree phase shift to the signal input to the amplifier.

16. The phased array system of claim 11, wherein the transformer is coupled to the switching network via a differential transmission line.

17. A method comprising:
    receiving a first indication to send a signal via a transmitter comprising a transformer, the transformer comprising a first winding and a second winding;
    receiving a second indication to apply phase shift to the signal;
    activating a first set of switches and deactivating a second set of switches of a switching network to couple processing circuitry to a first end of the first winding of the transformer to apply a first phase shift to the signal if the phase shift is greater than a predetermined phase angle; and
    activating the second set of switches and deactivating the first set of switches of the switching network to couple the processing circuitry to a second end of the first winding of the transformer to apply a second phase shift to the signal if the phase shift is not greater than the predetermined phase angle.

18. The method of claim 17, wherein the predetermined phase angle is 180 degrees.

19. The method of claim 17, wherein the first phase shift comprises a 180 degree phase shift.

20. The method of claim 17, wherein the second phase shift comprises a 0 degree phase shift.

* * * * *